United States Patent Office 3,657,270
Patented Apr. 18, 1972

3,657,270
1-PHENYL-1H-INDAZOLE-4-ACETIC ACIDS
Franklin W. Short, Saline, and Milton L. Hoefle, Ann Arbor, Mich., assignors to Parke, Davis & Company, Detroit, Mich.
No Drawing. Continuation-in-part of application Ser. No. 717,448, Mar. 29, 1968. This application Jan. 16, 1970, Ser. No. 3,505
Int. Cl. C07d 49/18
U.S. Cl. 260—310 C
10 Claims

ABSTRACT OF THE DISCLOSURE

Novel indazole acetic acids (I)

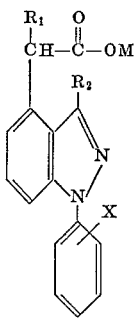

having pharmacological activity and being particularly useful as anti-inflammatory agents for the prevention and treatment of inflammation, are provided by hydrolyzing indazoleacetic acid compounds (II) or by hydrolyzing and decarboxylating α-cyanoesters (III)

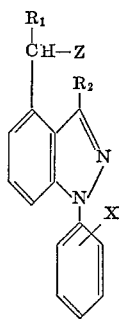 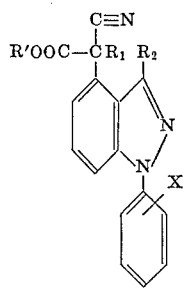

where $R_1$ and $R_2$ individually represent hydrogen or methyl, R' is lower alkyl, M is hydrogen or a cation, X is hydrogen, methyl, fluoro or chloro, and Z is a carbon-linked group hydrolyzable to a carboxyl group.

This is a continuation-in-part of application Ser. No. 717,448, filed Mar. 29, 1968, now abandoned.

SUMMARY AND DETAILED DESCRIPTION

The present invention relates to novel indazole acetic acids and to means for their production. More particularly, the invention relates to novel 1-phenylindazole-4-acetic acids and derivatives thereof having the formula

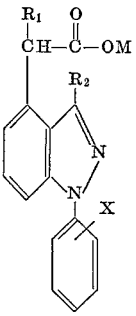

where $R_1$ and $R_2$ individually represent hydrogen or methyl, X is hydrogen, methyl, fluoro or chloro, and M is hydrogen or a pharmaceutically acceptable cation. Some examples of preferred pharmaceutically acceptable cations are alkali metal, alkaline earth metal, magnesium, aluminum, ammonium and amine cations. In general, the preferred compounds are those in which $R_1$ is H or $CH_3$, and $R_2$, X and M represent hydrogen. Also preferred are the compounds in which $R_1$ is H or $CH_3$, X is o-fluoro or o-chloro, and $R_2$ and M represent hydrogen.

In accordance with the invention, compounds having Formula I are produced by the hydrolysis of a compound having the formula

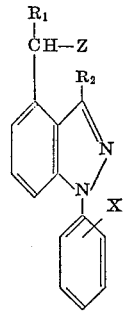

where $R_1$, $R_2$ and X are as defined and Z is a group hydrolyzable to a carboxyl group. For purposes of the invention, Z has at least one carbon atom and is linked or attached at this carbon atom to the —CH($R_1$)— group of Formula II, Z being accordingly defined herein as a carbon-linked group. Some examples of such groups hydrolyzable to a carboxyl group are cyano, alkoxycarbonyl, aryloxycarbonyl, aralkoxycarbonyl, carbamoyl, alkyl-substituted carbamoyl trihalomethyl, amidino, alkyl-substituted amidino, haloformyl,

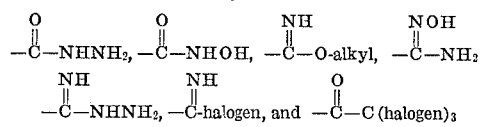

The precise nature of this group Z which is hydrolyzable to a carboxyl group is not critical because in carrying out the process it is converted to a carboxyl group. Therefore, if desired, the group Z can in appropriate cases contain one or more substituents such as lower alkyl, lower alkoxy, halogen, nitro, carboxy, or alkoxycarbonyl, and in those cases where the group Z is basic, it can also be employed in the form of an acid-addition salt. As used herein the term "group hydrolyzable to a carboxyl group" designates substituted as well as unsubstituted radicals. Compounds in which the group Z is the alkoxycarbonyl (especially methoxycarbonyl) group are preferred starting materials in the process because they are quite readily available and are hydrolyzable to the carboxyl derivatives in high yields.

The hydrolysis can be carried out under either acidic or alkaline conditions, by the use of an acidic or basic hydrolytic agent. Alkaline conditions are preferred and should be used exclusively with certain of the Z groups, for example, with the

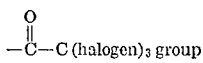

The hydrolysis can be carried out in water or in an aqueous solution of an unreactive, water miscible, organic solvent such as an aliphatic alcohol, dioxane, tetrahydrofuran, ethylene glycol, propylene glycol or a lower alkyl ether of ethylene glycol or of diethylene glycol, to which has been added an acid or a base to render the medium acidic or alkaline. Some examples of suitable bases are alkali metal hydroxides, alkaline earth metal hydroxides, alkali metal carbonates, alkali metal alkoxides, and trialkylammonium hydroxides. Some examples of suitable acids are mineral acids, strong organic acids such as p-toluenesulfonic acid, and acidic ion exchange resins. Preferred agents are alkali metal hydroxides such as sodium hydroxide or potassium hydroxide. The hydrolytic agent is normally employed in a considerable excess.

The hydrolysis is carried out by heating a solution or suspension of the starting material in a solvent medium containing an acid or a base until hydrolysis of the group Z is substantially complete. The required time and temperature naturally vary with the specific group Z and the basic or acidic agent used. However, in general, the reaction is carried out at a temperature between about 25–200° C., or the reflux temperature of the solvent, with a reaction time of aout 1–75 hours. When using one of the preferred basic hydrolytic agents the reaction is usually carried out at a temperature between 75–130° C., and is substantially complete within about 2–4 hours. When the hydrolysis is carried out under alkaline conditions, the product is present in the reaction mixture in the form of a salt; and it can be isolated in this form or, following treatment with an acid, preferably a mineral acid, it can be isolated as the free acid. When the hydrolysis is carried out under acidic conditions, the product is present in the reaction mixture as the free acid and it can be isolated directly in this form or, by subsequent treatment with a base, it can be isolated in salt form.

Starting materials required for use in the foregoing process can be prepared by reacting the appropriate 6,7-dihydro-1-phenyl-1H-indazol-4(5H)-one and the appropriate reactive side-chain compounds Br—CH($R_1$)—Z as illustrated in detail hereinafter, $R_1$, $R_2$ and Z being as defined above, Z preferably being carboalkoxy.

Also according to the invention, compounds having Formula I are produced by the hydrolysis and decarboxylation of an α-cyanoester having the formula

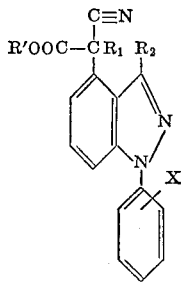

under either acidic or alkaline conditions, by the use of an acidic or basic agent desirably in excess; where $R_1$, $R_2$, R' and X are as defined, R' preferably being $C_{1-2}$ alkyl. For the process, basic conditions are preferred; suitable bases include alkali metal hydroxides, alkaline earth metal hydroxides, alkali metal alkoxides and trialkylammonium hydroxides. Preferred bases are the alkali metal hydroxides, particularly sodium hydroxide or potassium hydroxide. Suitable acids include the mineral acids and strong organic acids such as benzenesulfonic acid. The process is carried out by heating a solution or suspension of the starting material in a solvent medium containing an acid or base until hydrolysis and decarboxylation to the desired products are substantially complete. The required time and temperature vary depending on the nature of the starting material and the acidic or basic agent used. However, in general, temperature between about 50–150° C. for a period of about 1–72 hours is used, preferably at 65–85° C. for 16–20 hours. When the process is carried out under alkaline conditions, the product is present in the reaction mixture in the form of a salt. It can be isolated in this form or following treatment with an acid or preferably a mineral acid, it can be isolated as the free acid. When the process is carried out under acidic conditions, the product is present in the reaction mixture as the free acid. It can be isolated directly in this form or, by subsequent treatment with a base, it can be isolated in salt form. As a solvent for the process, water or an unreactive aqueous organic solvent is suitable such as, preferably, aqueous ethanol or other lower alkanol, or aqueous dioxane, tetrahydrofuran, ethylene glycol, propylene glycol or ethylene glycol dimethyl ether. Starting materials required for use can be prepared by oxidation of the appropriate alkyl α-cyano-6,7-dihydro-1-phenyl-1H-indazole-$\Delta^{4(5H),\alpha}$-acetate and, if necessary, by α-methylation of the resulting indazole-4-acetate product. The indazole-$\Delta^{4(5H),\alpha}$-acetate can be prepared by condensing the corresponding alkyl cyanoacetate with the respective 6,7-dihydro-1-phenyl-1H-indazol-4(5H)-one.

The compounds of the invention are useful as pharmacological agents. They possess a high degree of anti-inflammatory activity by either the oral or the parenteral route and hence are useful in preventing and treating inflammatory symptoms. The compounds have anti-inflammatory properties like those of the known anti-inflammatory agent phenylbutazone which properties can be demonstrated in standard tests in experimental animals. The test method in question, described by Winder et al., J. Pharmacol. Exp. Therap., 138, 1195, measures the antierythemagenic activity of a compound based on its ability to delay the normal appearance of an erythema in animals exposed to ultraviolet radiation; the acid of Formula I where R is methyl and $R_2$ and X are hydrogen has an effective dose, for example, of about 0.4 mg./kg. compared to about 5.3 mg./kg. for phenylbutazone.

In the test albino guinea pigs are chemically depilated and then locally exposed to a standard source of ultraviolet irradiation using a mid-lateral exposure site and a constant exposure time. For dosage purposes, the compound is administered by gavage, one-half of the dose being given one hour before the ultraviolet radiation and one-half immediately after the exposure to radiation. The scoring of the animals for erythema is done two hours after exposure to the radiation. The scoring is based on definiteness or indefiniteness of erythema. An exposed spot which develops no evident erythema scores 0.0 while one with a full circle of definite redness of any intensity scores 1.0. A spot with erythema but not a clearly complete circle of it (such that the partial redness is not clearly related to the ultraviolet exposure) scores 0.5. Animals with total three spot scores of 2.0 to 3.0 are counted as erythemic and those with 1.5 or less as non-erythemic. Each test compound at each dosage level is compared with (a) a standard reference dose (17.5 mg./kg.) of phenylbutazone and (b) a vehicle control. The anti-inflammatory activity of a test compound is established by statistically comparing the fraction of non-erythemic animals at each dosage level with the fraction of non-erythemic animals treated with the standard dose of phenylbutazone and the fraction of non-erythemic animals treated only with a vehicle.

The compounds are active both orally and by the parenteral route and can therefore be constituted for use in dosage unit form for oral and parenteral administration. Suitable dosage forms are provided according to general considerations which will be known to those skilled in the art. Thus, for oral administration, dosage forms such as tablets, powders, capsules, solutions and suspensions in which the compounds are incorporated with a carrier or diluent are suitable. Solid carriers and diluents include sugars such as lactose and sucrose; cellulose derivatives such as sodium carboxymethyl cellulose, ethyl cellulose, methyl cellulose and cellulose acetate phthalate; gelatin (including hard and soft shell capsules); talc, corn starch, stearic acid and magnesium stearate. Liquid carriers and diluents suitable for use include vegetable oils such as peanut oil, cottonseed oil, sesame oil, olive oil, corn oil and oil of theobroma; polyethylene glycol; propylene glycol; glycerine; sorbitol; ethanol; and water. Suitable preservatives and flavoring agents can also be incorporated in such compositions. In the production of dosage forms such as tablets, an enteric coating or sugar coating can be applied to make the medicament more palatable. If administration by the parenteral route is desired, the compounds can be formulated in ampoule form as a suspension or solution in a liquid diluent. Other therapeutic agents can also be incorporated with the compounds.

The invention is illustrated by the following examples.

Example 1

(a) A solution of methyl 1-phenyl-1H-indazole-4-acetate (5.55 g.), potassium hydroxide (2.65 g.) 45 ml. of ethanol, and 10 ml. of water is refluxed two hours and then concentrated. An aqueous solution of the residue is washed with ether and acidified using dilute hydrochloric acid. The mixture is extracted with ether and the ether extracts concentrated. The residual product after removal of ether is 1-phenyl-1H-indazole-4-acetic acid; M.P. 155–157° C. after recrystallization from ethyl acetate.

The corresponding sodium salt is obtained by treating a solution of 2.5 g. of the acid in 10 ml. of hot ethanol with 10 ml. of 1 N aqueous sodium hydroxide solution. Evaporation to dryness yields the sodium salt. Amine salts of 1-phenyl-1H-indazole-4-acetic acid can be obtained by the following representative procedure (for the choline salt):

A solution of 1.4 g. of choline chloride in 10 ml. of methanol is added to a solution of 2.7 g. of sodium 1-phenyl-1H-indazole-4-acetate in 50 ml. of methanol. After one hour, the mixture is filtered, and the choline salt is isolated by removing the methanol from the filtrate under vacuum.

(b) The acetate ester starting material for the procedure of (a) can be obtained as follows:

To a solution of 15.0 g. of 6,7-dihydro-1-phenyl-1H-indazol-4-(5H)-one and 225 ml. of dimethoxyethane at 70° C., is added 9.7 ml. of methyl bromoacetate and 22.3 g. of zinc mixed with a few iodine crystals. After the solution becomes cloudy, the mixture is stirred at at reflux for one and one-half hours. At this point, a series of four additions of 6.0 g. zinc and 2.5 ml. of methyl bromoacetate, using one hour intervals, is begun. Upon completion of these additions, the resulting mixture is refluxed one and one-half hours longer and then stirred overnight at room temperature before treatment with 225 ml. of cold aqueous 10% sulfuric acid. The mixture is filtered and the filtrate chilled to precipitate a semi-solid which is collected by filtration and then washed with water. Concentration of ether extracts of the latter filtrate yields an oil which is combined with the above semi-solid for crystallization from methanol. The product is methyl 6,7-dihydro-1-phenyl-1H-indazole-$\Delta^{4(5H),\alpha}$-acetate; M.P. 139–141° C.

A mixture of 9.65 g. of the product, 50 ml. of mesitylene, and 1.0 g. of 20% palladium on charcoal is stirred at reflux for twenty-one hours and then filtered. The filtrate is concentrated to a residue which is mixed with 0.58 g. of sulfur and heated to 225° C. over a period of forty-five minutes. After heating at 225–233° C. for another 1.75 hours, the mixture is cooled, dissolved in benzene and the benzene solution processed through a chromatograph column of 270 g. of activated magnesium silicate (e.g., Florisil®). The column is eluted with benzene-ether and the eluates are concentrated to an oil which is dissolved in ethanol for treatment with activated charcoal. Filtration and concentration yield the product methyl 1-phenyl-1H-indazole-4-acetate.

Example 2

(a) A mixture of methyl α-methyl-1-phenyl-1H-indazole-4-acetate (5.0 g.), 1.85 ml. of aqeous 50% sodium hydroxide, 40 ml. of ethanol, and 8 ml. of water is heated briefly on a steam bath and then kept at room temperature for seventeen hours. The residue obtained on concentration is treated with 60 ml. of warm water and filtered. The filtrate is washed with ether, acidified and the resulting oily product extracted with ether. The extracts are washed with water, dried over anhydrous sodium sulfate, and concentrated. The product, which solidifies on standing, is α-methyl - 1 - phenyl - 1H - indazole - 4 - acetic acid; M.P. 129–132° C. after recrystallization from methanol-water.

The ammonium salt of the product is obtained by treating the free acid product with excess ammoniacal ethanol and removing the solvent from the mixture. Similarly, but using equivalent amounts of diethanolamine and the free acid both in acetone solution, the diethanolamine salt is obtained and isolated in crystalline form after dilution of the clear solution with petroleum ether. Likewise, the methylamine salt is obtained by treating a methanolic solution of the free acid with a slight excess of methylamine in ethanol. The mixture is evaporated to dryness to give a residue of the methylamine salt of α-methyl-1-phenyl-1H-indazole-4-acetic acid.

The calcium salt is obtained by neutralizing an ethanolic solution of the free acid with aqueous calcium hydroxide and subjecting the mixture to lyophilization to yield a residue of the calcium salt.

(b) The acetate ester starting material for the procedure of 2(a) can be obtained as follows:

Methyl 6,7 - dihydro - α - methyl - 1 - phenyl - 1H - indazole - 4 - acetate [6.35 g., M.P. 82–83.5° C. after trituration with isopropyl ether and recryst allization from methanol-water, obtained by the procedure of Example 1(b) starting from methyl α-bromopropionate] and 0.757 g. of sulfur is stirred under nitrogen while heating to about 200° C. over a period of twenty minutes. After stirring at 200–216° C. for another forty minutes, the mixture is cooled, dissolved in chloroform, and the solution treated with activated charcoal. The residue obtained on removal of chloroform is dissolved in benzene and subjected to chromatography on 180 g. of activated magnesium silicate as in Example 1(b). The product, methyl α-methyl-1-phenyl-1H-indazole-4-acetate, is isolated by elution with benzene and benzene-ether mixtures and concentration of the eluates.

Example 3

(a) A solution of 22.0 g. of methyl 1-(o-fluorophenyl)-1H-indazole-4-acetate, 12.8 g. of 50% aqueous sodium hydroxide, and 300 ml. of ethanol is refluxed four hours and then concentrated in vacuo. An aqueous solution of the residue is acidified with 100 ml. of 6 N hydrochloric acid, and the product which separates is collected by filtration, washed with water and dried. The product is 1-(o- fluorophenyl-1H-indazole-4-acetic acid; M.P. 185–189° C. after recrystallization from aqueous ethanol.

(b) The acetate ester starting material for the precedure of paragraph 3(a) can be obtained as follows:

2,6 - dioxocyclohexanecarboxaldehyde 1 - [(o-fluorophenyl)hydrazone] (51.7 g., M.P. 157–159.5° C. after recrystallization from ethanol, obtained by condensation of 72.1 g. of 2-N-phenylformimidoyl - 1,3 - cyclohexanedione and 44.4 g. of o-fluorophenylhydrazine in ethanol) is cyclized in toluene, using p-toluenesulfonic acid as catalyst, to yield 1-(o-fluorophenyl)-6,7-dihydro - 1H - indazol-4(5H)-one; M.P. 100–103° C.

(c) Using the procedure of Example 1(b), the product (21.5 g.) is subjected to condensation with 44.0 g. of methyl bromoacetate, 62.8 g. of zinc (granular, activated), and catalytic amounts of iodine and mercuric chloride in 700 ml. of benzene. A mixture of 25.8 g. of the condensation product methyl 1-(o-fluorophenyl)-6,7-dihydro-1H-indazole-$\Delta^{4(5H),\alpha}$-acetate and 3.2 g. of sulfur is stirred under nitrogen while heating to about 205°. After one hour at this temperature, the mixture is cooled and a solution of the residue in benzene is stirred with Raney nickel. Removal of the Raney nickel by filtration, followed by evaporative removal of solvent, yields methyl 1-(o-fluorophenyl)-1H-indazole-4-acetate.

Example 4

(a) A solution of 27.8 g. of methyl 1-(o-fluorophenyl)-α-methyl-1H-indazole-4-acetate, 16.0 g. of 50% aqueous sodium hydroxide, and 175 ml. of ethanol is refluxed four hours and then concentrated in vacuo. A solution of the residue in 300 ml. of water is acidified using 60 ml. of 6 N hydrochloric acid, and the resulting mixture extracted with ether. After washing by water and drying, the extracts are concentrated and a solution of their residue in benzene is adsorbed on a column of 500 g. of silica gel. The solid fractions obtained by elution with 15 vol. percent ether in benzene are combined and crystallized from aqueous ethanol to yield the desired product 1-(o-fluorophenyl)-α-methyl-1H-indazole-4-acetic acid; M.P. 131.5–135.5° C.

(b) The starting material methyl 1-(o-fluorophenyl)-α-methyl-1H-indazole-4-acetate for the procedure of paragraph 4(a) can be obtained by the step-wise method of Example 3(c) substituting 47.8 g. of methyl-2-bromopropionate for 44.0 g. of methyl bromoacetate, then heating mixture of 28.0 g. of the resulting product methyl 1-(o-fluorophenyl)-6,7-dihydro-α-methyl - 1H - indazole-4-acetate and 3.2 g. of sulfur for one hour at 190° and finally working up with Raney nickel and isolating.

Example 5

(a) A solution of 26.2 g. of methyl 1-(o-chlorophenyl)-1H-indazole-4-acetate, 15.0 g. of 50% aqueous sodium hydroxide, and 200 ml. of ethanol is refluxed four hours and then concentrated in vacuo. An aqueous solution of the residue is acidified, using 6 N hydrochloric acid, and the resulting mixture extracted with benzene. After washing and drying, the extract is adsorbed on a column of 950 g. of silica gel. The solid fractions, obtained by elution with 25–30 vol. percent ether in benzene, are combined and crystallized from aqueous ethanol to yield product, 1-(o-chlorophenyl)-1H-indazole-4-acetic acid; M.P. 151–153° C.

(b) The indazole starting material for the procedure of paragraph 5(a) can be obtained by the following step-wise procedure:

A solution of 0.5 g. of 2,6-dioxocyclohexanecarboxaldehyde, 0.6 g. of o-chlorophenylhydrazine, and 5 ml. of ethanol is refluxed two hours and then concentrated in vacuo. The solid residue is crystallized from aqueous ethanol to yield product, 2,6-dioxocyclohexanecarboxaldehyde 1-[(o-chlorophenyl)hydrazone]; M.P. 135–136° C.

Following procedure described in Example 3(b), the product is cyclized in toluene, using p-toluenesulfonic acid as catalyst, to yield 1-(o-chlorophenyl)-6,7-dihydro-1H-indazol-4(5H)-one; M.P. 120.5–122° C.

The latter product in the amount of 21.7 g. is condensed [as in Example 1(b)] with 41.3 g. of methyl bromoacetate and 58.8 g. of zinc in 700 ml. of benzene to yield methyl 1-(o - chlorophenyl) - 6,7 - dihydro-1H-indazole-$\Delta^{4(5H),\alpha}$-acetate which in the amount of 26.4 g. is dehydrogenated with 2.8 g. of sulfur, as in Example 2(b), to provide methyl 1-(o-chlorophenyl)-1H-indazole-4-acetate.

(c) Substituting 29.2 g. of ethyl 1-(o-chlorophenyl)-α-methyl-1H-indazole-4-acetate for 26.2 g. of methyl 1-(o-chlorophenyl)-1H-indazole - 4 - acetate in Example 5(a), the product obtained is 1-(o-chlorophenyl)-α-methyl-1H-indazole-4-acetic acid; M.P. 57–60° C. after crystallization from hexane and from ethyl acetate-cyclohexane. The indazole starting material can be obtained by reacting 1-(o-chlorophenyl) - 6,7 - dihydro-1H-indazol-4(5H)-one [as in Example 5(b)], substituting 48.9 g. of ethyl 2-bromopropionate for 41.3 g. of methyl bromoacetate, to provide ethyl 1-(o-chlorophenyl)-6,7-dihydro-α-methyl-1H-indazole-4-acetate which in the amount of 29.4 g. is dehydrogenated with 2.9 g. of sulfur. The product is ethyl 1-(o-chlorophenyl)-α-methyl-1H-indazole-4-acetate.

Example 6

(a) A solution of 12.5 g. of ethyl α-cyano-α-methyl-1-(p-tolyl)-1H-indazole-4-acetate, 6.5 g. of 50% aqueous sodium hydroxide, and 300 ml. of ethanol is refluxed twenty-four hours and then concentrated in vacuo. An aqueous solution of the residue is washed with ether and acidified with hydrochloric acid. Ether extracts of the resulting mixture are washed with water, dried, and then evaporated to dryness. A solution of the residue in benzene is set on a column of 500 g. of silica gel and product eluted by benzene-ether mixtures. Concentration of the eluates yields the product, α-methyl-1-(p-tolyl)-1H-indazole-4-acetic acid.

(b) The indazole starting material for the foregoing procedure can be obtained as follows:

A mixture of 20.6 g. of 6,7-dihydro-1-(p-tolyl)-1H-indazol-4(5H)-one [G. Lehmann, H. Wehlan, and G. Hilgetag, Chem. Ber. 100, 2967 (1967)], 22.6 g. of ethyl cyanoacetate, 22.6 g. of glacial acetic acid, 2.0 g. of ammonium acetate and 350 ml. of benzene is stirred at reflux three days, while collecting water formed during condensation. Concentration of the resulting solution yields ethyl α-cyano-6,7-dihydro-1-(p-tolyl)-1H-indazole-$\Delta^{4(5H),\alpha}$-acetate.

A stirring mixture of 13.5 g. of the latter product and 1.4 g. of powdered sulfur is slowly heated to 225°. After one hour at this temperature, the mixture is cooled and dissolved in 100 ml. of benzene. The resulting solution is stirred with 5 g. of Raney nickel for sixteen hours and then filtered. Concentration yields ethyl α-cyano-1-(p-tolyl)-1H-indazole-4-acetate.

To a suspension of 1.5 g. of a 50% mineral oil dispersion of sodium hydride in 25 ml. of dry tetrahydrofuran, is carefully added a solution of 9.7 g. of the cyanoacetate in 40 ml. of tetrahydrofuran (about twenty minutes). The resulting solution is stirred at 20–25° for two hours and then treated with a solution of 5.0 g. of methyl iodide in 10 ml. of tetrahydrofuran. After refluxing three hours, the mixture is cooled and poured into dilute hydrochloric acid. Ether extracts of the acid solution are washed with several portions of 2 N aqueous sodium hydroxide and with saturated aqueous sodium chloride, dried, and concentrated in vacuo. The product is ethyl α - cyano - α - methyl-1-(p-tolyl)-1H-indazole-4-acetate.

(c) Substituting 13.1 g. of ethyl -cyano-3-mehyl-1-phenyl-1H-indazole-4-acetate for 12.5 g. of ethyl α-cyano-α-methyl-1-(p-tolyl)-1H-indazole-4-acetate in Example 6(a), the product obtained is 3-methyl-1-phenyl-1H-indazole-4-acetic acid.

The 3-methylindazole starting material can be obtained [by a procedure like that of Example 6(b)] by substituting 6,7-dihydro-3-methyl-1-phenyl-1H-indazol-4-(5H)-one (J. Chem. Soc., 803, 1953) for 6,7-dihydro-1-(p-tolyl)-1H-indazol-4(5H)-one to obtain ethyl α-cyano-6,7-dihydro-3-methyl-1-phenyl-1H-indazole-$\Delta^{4(5H),\alpha}$-acetate, and substituting the latter for ethyl α-cyano-6,7-dihydro-1-(p-tolyl)-1H)indazole-$\Delta^{4(5H),\alpha}$-acetate in Example 6(b) to obtain ethyl α-cyano-3-methyl-1-phenyl-1H-indazole-4-acetate.

We claim:

1. A compound of the formula

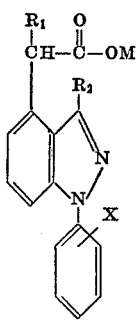

where $R_1$ and $R_2$ individually represent hydrogen or methyl, X is hydrogen, methyl, fluoro or chloro, and M is hydrogen or a pharmaceutically acceptable cation.

2. A compound according to claim 1 which is 1-phenyl-1H-indazole-4-acetic acid.
3. A compound according to claim 1 which is α-methyl-1-phenyl-1H-indazole-4-acetic acid.
4. A compound according to claim 1 which is 1-phenyl-1H-indazole-4-acetic acid sodium salt.
5. A compound according to claim 1 which is 1-phenyl-1H-indazole-4-acetic acid choline salt.
6. A compound according to claim 1 which is α-methyl-1-phenyl-1H-indazole-4-acetic acid ammonium salt.
7. A compound according to claim 1 which is α-methyl-1-phenyl-1H-indazole-4-acetic acid calcium salt.
8. A compound according to claim 1 which is 1-(o-fluorophenyl)-1H-indazole-4-acetic acid.
9. A compound according to claim 1 which is 1-(o-fluorophenyl)-α-methyl-1H-indazole-4-acetic acid.
10. A compound according to claim 1 which is 1-(o-fluorophenyl)-1H-indazole-4-acetic acid.

References Cited

UNITED STATES PATENTS 3,414,581  12/1968  Seefelder et al. _____ 260—310

HENRY R. JILES, Primary Examiner
G. T. TODD, Assistant Examiner

U.S. Cl. X.R.
424—273